Nov. 11, 1958     G. H. DE LISLE     2,859,566
POWER DRIVE FOR RECIPROCATING ABRADING TOOLS
Filed Aug. 25, 1955
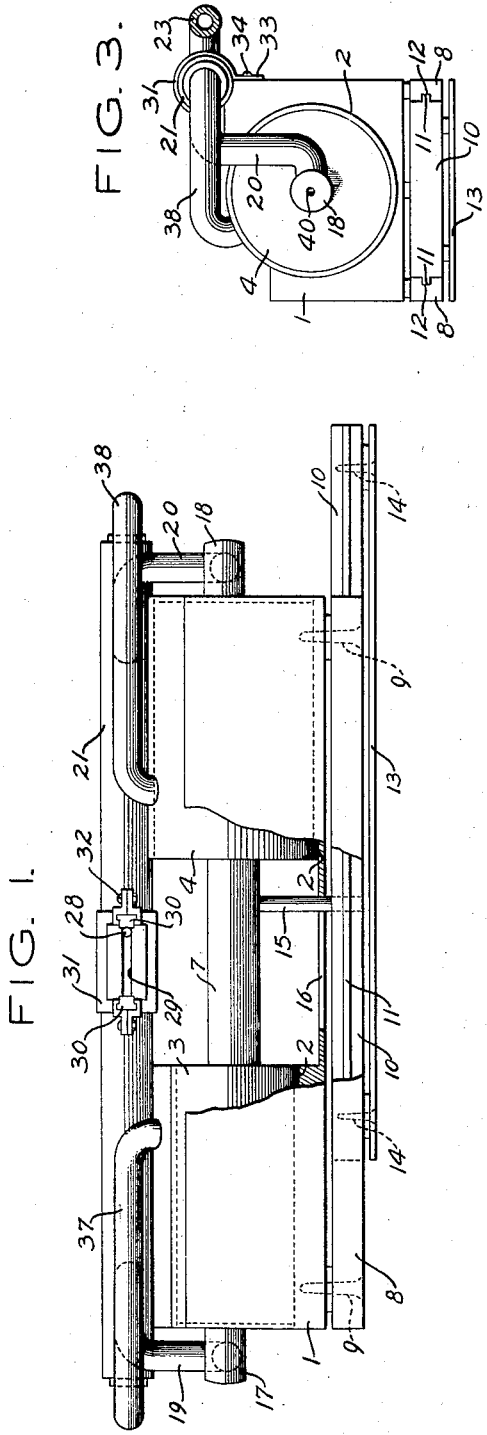
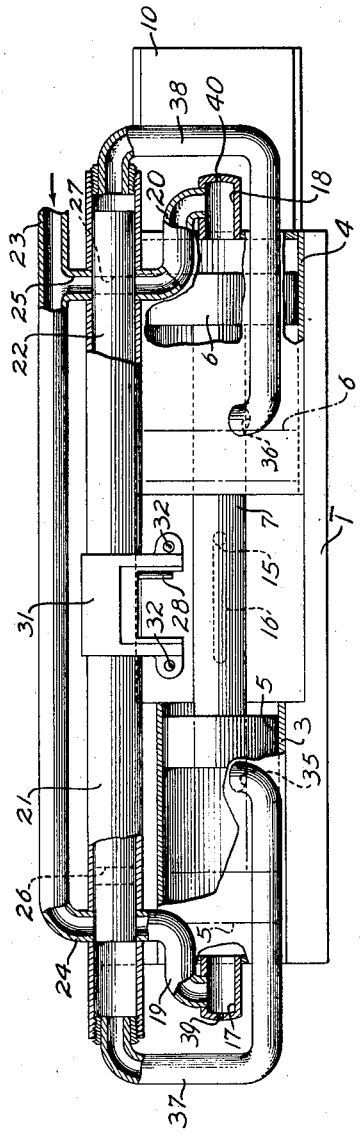
*INVENTOR.*
GEORGE H. DELISLE
BY *Chapin & Neal*
ATTORNEYS United States Patent Office 2,859,566
Patented Nov. 11, 1958

2,859,566

POWER DRIVE FOR RECIPROCATING ABRADING TOOLS

George H. De Lisle, Feeding Hills, Mass.

Application August 25, 1955, Serial No. 530,548

1 Claim. (Cl. 51—170)

This invention relates to improvements in power drives for reciprocating abrading tools such as files or sanders.

The principal object of the invention is to provide a compressed-air powered drive for tools of the above character which is smooth in operation and in which reversal of the direction of motion of the tool takes place without shock and vibration.

Other and further objects and advantages will be made apparent in the disclosure of the accompanying drawings and in the following specification and claim.

In the drawings,

Fig. 1 is a side elevational view of a device embodying the invention, parts being broken away;

Fig. 2 is a plan view of the structure of Fig. 1, parts broken away; and

Fig. 3 is an end elevational view looking from the right in Fig. 1.

Referring to the drawings 1 designates a block-like frame formed with arcuate seats 2 for the support of spaced opposed cylinders 3 and 4, the diameter of cylinder 4 being slightly larger than that of cylinder 3 to give a somewhat more powerful stroke in one direction than the other. Pistons 5 and 6, connected by a piston rod 7, operate respectively in the cylinders 3 and 4.

Opposed grooved guideways 8 are fixed to the longitudinal edges of the bottom of frame 1 by screws 9 or other suitable means. A tool carrying slide 10 is reciprocably mounted in guideways 8 by means of tongues 11 slidably engaging in grooves 12 formed in the guideways.

A file, sander or other similar tool 13 is fixed to slide 10 by screws 14 and slide 10 is connected to rod 7 by a pin 15, which extends through a slot 16 in the frame, whereby as the pistons 5 and 6 work in their cylinders the slide 10 and the tool carried thereby are reciprocated.

The heads of cylinders 3 and 4 are provided with respective cylindrical inlet chambers 17 and 18 connected by respective pipes 19 and 20 to a valve cylinder 21 in which a valve piston 22 is slidably mounted. Compressed air is supplied to cylinder 21 through a pipe 23 from any suitable source, not shown. Pipes 24 and 25 open from pipe 23 to cylinder 21 directly opposite pipes 19 and 20 respectively, and compressed air is adapted to be alternately supplied to pipes 19 and 20, through respective ports 26 and 27 extending through valve piston 22, as later described.

Piston 22 is provided with a pin 28 which extends through a slot 29 formed in cylinder 21 and by engagement with spaced stops 30 limits the sliding movement of the rod between a position in which port 26 connects pipes 24—19 and a position in which port 27 connects pipes 25—20, the latter position being shown in Fig. 2. Pin 28 also prevents rotary movement of rod 22 in cylinder 21. Stops 30 which are preferably formed of a somewhat yielding material such as rubber or leather are carried by a bracket 31 adjustably clamped around cylinder 20 by bolts 32, bracket 31 being provided with an extension 33, Fig. 3, which is fixed to frame 1 by screws 34.

The sides of cylinders 3 and 4 are provided with respective ports or openings 35 and 36 connected by respective pipes 37 and 38 to the adjacent ends of cylinder 20.

The chambers 16 and 17 are provided with small vents 39 and 40 respectively.

It will be understood that piston 22 slides closely in cylinder 21 so that there is no effective leakage of pressure past piston 22.

With the parts in the full line position of Fig. 2, compressed air is admitted to cylinder 4 through pipes 23, 25, part 27 and pipe 20 driving the pistons 6 and 5 to the left, as shown in that figure, and carrying slide 10 and tool 13 to the left. As piston 5 initially advances in cylinder 3 pressure builds up in the cylinder 3 and is transmitted in part through pipe 37 to the left end of valve piston 22, assuring that it is in extreme right hand position, in part escapes through small vent 39 and in part is compressed in cylinder 3 to provide a dash-pot cushion to bring the pistons 5 and 6, slide 10 and tool 13 to a stop without chatter, shock or vibration. During the initial advance of piston 6 the adjacent end of cylinder 21 is vented through pipe 38 and port 36, further assuring that valve piston 22 remains in proper position.

When the pistons 5 and 6 reach the dash-line positions of Fig. 2 the left hand end of valve piston 22 is vented through pipe 37 and port 35 and the pressure entering cylinder 4 is transmitted to the right hand end of valve rod 22 through vent 36 and pipe 38 thus causing valve piston 22 to move to the left moving port 27 out of line with pipes 20 and 25, thus cutting off the supply of pressure to cylinder 4, and bringing port 26 into alignment with pipes 19 and 24 supplying pressure to cylinder 3 to drive pistons 5 and 6, slide 10 and tool 13 to the right to bring the parts again to the full line position of Fig. 2 for successive repetitions of the cycle and reciprocation of the tool. During the movement of pistons 5 and 6 to the right, under pressure supplied to cylinder 3 through pipes 24, port 26 and pipe 19, the air in cylinder 4 is transmitted in part to the right hand end of valve piston 26 through port 36 and pipe 38 to assure that it is held in its left hand position, in part escapes through small vent 40, and in part is compressed in cylinder 4 to provide a dash-pot cushion in bringing the parts to a stop without chatter, shock or vibration, and affect the reversal of piston 22, all as previously described in connection with the leftward drive of the pistons 5 and 6.

The vents 39 and 40 are always open and result in a slight loss in the pressure applied to the working cylinder, at the same time that the vent in the "idle" cylinder provides a dash-pot venting of the latter. The actual size of the vents will depend on the size of the cylinders and length of stroke. For a cylinder having a diameter of 1¼ inches with a piston stroke of ½ inch, a 1/16 inch vent has been found satisfactory, with the size of the vent being increased or decreased generally in proportion to the size of the cylinder and length of stroke. In any event the pressure in the idle cylinder is always substantially less than in the working cylinder and is constantly decreasing during the working stroke of the working piston.

The described construction provides a rapid, smooth, quiet reciprocation of the tool carrier and further results in a power tool which is easy to handle because of its freedom from vibration.

What is claimed is:

In a pneumatic pressure driven tool, a frame, a pair of aligned, oppositely directed power cylinders mounted on said frame, each having one end closed and the opposite end open, respective power pistons working in said cylinders and providing respective power pressure chambers between said closed ends of the cylinders and their respective pistons, a piston rod connecting said pistons, a tool carrier reciprocably mounted in said frame, an abrasion type tool fixed to said carrier, means connecting the tool carrier to said piston rod to reciprocate the carrier and the tool carried thereby, respective pressure supply ports opening to the power pressure chambers adjacent the closed ends of the cylinders, valve means opening said supply ports of the cylinders when one of the pistons in its corresponding cylinder is adjacent the closed end of said cylinder and at the same time closing the supply port of the opposite cylinder, said valve means comprising a valve cylinder, a valve piston of less length than the valve cylinder slidably mounted therein, means resiliently limiting the stroke of the valve piston, the ends of the valve cylinder being closed to form pressure chambers at the ends of the valve piston, respective ports and passages in the valve cylinder and valve piston controlling the opening and closing of the pressure supply ports of the power cylinders, ports in the walls of the power cylinders adjacent the open ends thereof and respectively connected to the adjacent end of the valve cylinder and positioned to vent the adjacent end of the valve cylinder during a major portion of the power stroke of the adjacent power piston and to supply pressure to the adjacent end of the valve piston at the end of the power stroke of said adjacent power piston, said closed end of each power cylinder being formed with a small constantly open vent, said vents providing the sole exhaust opening from the said power pressure chambers.

References Cited in the file of this patent
UNITED STATES PATENTS

| | | |
|---|---|---|
| 734,276 | Metcalf | July 21, 1903 |
| 1,887,620 | Bowlby | Nov. 15, 1932 |
| 2,555,018 | Seggern | May 29, 1951 |
| 2,618,107 | Martin | Nov. 18, 1952 |